United States Patent
Chong et al.

(10) Patent No.: US 10,267,975 B2
(45) Date of Patent: Apr. 23, 2019

(54) LIGHT GUIDE PLATE, AND BACKLIGHT UNIT AND DISPLAY DEVICE INCLUDING THE SAME

(71) Applicant: SAMSUNG DISPLAY CO., LTD., Yongin-si, Gyeonggi-do (KR)

(72) Inventors: Joonggun Chong, Yongin-si (KR); Jehong Choi, Suwon-si (KR); Chanjae Park, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/664,050

(22) Filed: Jul. 31, 2017

(65) Prior Publication Data

US 2018/0039009 A1 Feb. 8, 2018

(30) Foreign Application Priority Data

Aug. 2, 2016 (KR) .......................... 10-2016-0098340

(51) Int. Cl.
*F21V 8/00* (2006.01)
*G02B 6/00* (2006.01)
(Continued)

(52) U.S. Cl.
CPC .............. *G02B 6/0043* (2013.01); *G02B 6/00* (2013.01); *G02B 6/0055* (2013.01); *G02B 6/0065* (2013.01); *G02F 1/1368* (2013.01); *G02F 1/136286* (2013.01); *G02F 2001/133607* (2013.01); *G02F 2201/123* (2013.01)

(58) Field of Classification Search
CPC .. G02B 6/0043; G02B 6/0011; G02B 6/0013; G02B 6/0015; G02B 6/0016;
(Continued)

(56) References Cited

U.S. PATENT DOCUMENTS 7,692,744 B2 4/2010 Ishigaki et al.
8,033,706 B1 * 10/2011 Kelly ................... G02B 6/0036
362/307

(Continued)

FOREIGN PATENT DOCUMENTS

JP 2003322849 A 11/2003
KR 1020080033880 A 4/2008
(Continued)

OTHER PUBLICATIONS

English translation of KR 20100007310 A, Title: Back Light Unit and Unit Production Means, Author: Kim Jae Heun KR; Date of publication: Aug. 3, 2011.*

*Primary Examiner* — Shan Liu
(74) *Attorney, Agent, or Firm* — Cantor Colburn LLP

(57) ABSTRACT

A backlight unit and a display device includes a light source which generates light used by a display panel to display an image; and a light guide plate which receives the light from the light source and emits the light through a light emission surface thereof. The light guide plate includes: a base layer; a light transmitting layer on the base layer and defining the light emission surface of the light guide plate; and a light transmitting particle provided in plurality between the base layer and the light transmitting layer. The light transmitting particle has a refractive index higher than a refractive index of the light transmitting layer.

10 Claims, 5 Drawing Sheets

(51) Int. Cl.
*G02F 1/1362* (2006.01)
*G02F 1/1368* (2006.01)
*G02F 1/1335* (2006.01)

(58) Field of Classification Search
CPC .... G02B 6/0018; G02B 6/002; G02B 6/0021;
G02B 6/0023; G02B 6/0025; G02B
6/0026; G02B 6/0028; G02B 6/003;
G02B 6/0031; G02B 6/0088; G02B
2006/12083; G02B 2006/12085; G02B
2006/12088; G02B 2006/1209; G02B
2006/12092; G02B 6/0055; G02B 6/0065;
G02B 21/0032; G02B 21/06; G02B
21/16; G02B 6/0033; G02B 6/0035;
G02B 6/0036; G02B 6/0038; G02B
6/004; G02B 6/0041; G02B 6/0045;
G02B 6/0046; G02B 6/0048; G02B
6/0051; G02B 6/0053; G02B 6/0056;
G02B 6/0058; G02B 6/006; G02B
6/0061; G02B 6/0063; G02B 6/0066;
G02B 6/0068; G02B 6/007; G02B
6/0071; G02B 6/0073; G02B 6/0075;
G02B 6/0076; G02B 6/0078; G02B
2006/12095; G02F 1/1368; G02F
2201/123; G02F 1/133615; G02F
1/136286; G01N 21/62; G01N 21/6458;
B82Y 20/00

USPC .............................. 349/65; 359/385; 385/129
See application file for complete search history.

(56) References Cited

U.S. PATENT DOCUMENTS

| | | | | |
|---|---|---|---|---|
| 2003/0117790 | A1* | 6/2003 | Lee | G02B 6/0043 362/617 |
| 2006/0146573 | A1* | 7/2006 | Iwauchi | G02B 6/0018 362/621 |
| 2007/0279551 | A1* | 12/2007 | Umebayashi | G02B 6/0053 349/65 |
| 2008/0151375 | A1* | 6/2008 | Lin | G02B 6/0036 359/599 |
| 2008/0266901 | A1* | 10/2008 | Chang | G02B 6/0021 362/618 |
| 2009/0185383 | A1* | 7/2009 | Justel | G02B 6/005 362/311.01 |
| 2012/0026742 | A1* | 2/2012 | Fang | G02B 6/0043 362/355 |
| 2014/0307465 | A1* | 10/2014 | Choi | G02F 1/133615 362/606 |
| 2016/0109635 | A1 | 4/2016 | Lee et al. | |

FOREIGN PATENT DOCUMENTS

| | | | |
|---|---|---|---|
| KR | 20110087740 A | * | 8/2011 |
| KR | 1020130047484 A | | 5/2013 |
| KR | 1020160045213 | | 4/2016 |

* cited by examiner

LIGHT GUIDE PLATE, AND BACKLIGHT UNIT AND DISPLAY DEVICE INCLUDING THE SAME

This application claims priority to Korean Patent Application No. 10-2016-0098340, filed on Aug. 2, 2016, and all the benefits accruing therefrom under 35 U.S.C. § 119, the content of which in its entirety is herein incorporated by reference.

BACKGROUND

1. Field

Exemplary embodiments of the invention relate to a light guide plate, a backlight unit and a display device including the light guide plate, and a display device including the backlight unit.

2. Description of the Related Art

Display devices may be classified into liquid crystal display ("LCD") devices, organic light emitting diode ("OLED") display devices, plasma display panel ("PDP") devices, electrophoretic display devices and the like based on a light emitting scheme thereof.

An LCD device, which is a passive light emitting device, includes a display substrate which generates and displays an image and a backlight unit ("BLU") for providing light to the display substrate. Backlight units are classified into a direct type backlight unit, an edge type backlight unit and a corner type backlight unit according to the position of the light source within a display device.

Efforts have been made to simplify the structure of the backlight unit in order to reduce manufacturing costs and reduce an overall thickness of the display device including such backlight unit.

SUMMARY

Exemplary embodiments of the invention provides a backlight unit having a reduced thickness and for which manufacturing costs thereof are reduced, and to a display device including the backlight unit.

According to an exemplary embodiment, a backlight unit includes: a light source which generates light used by a display panel of a display device to display an image; and a light guide plate which receives the light from the light source and emits the light toward the display panel of the display device. The light guide plate includes: a light emission surface through which the emitted light exits from the light guide plate toward the display panel of the display device; a base layer; a light transmitting layer on the base layer, the light transmitting layer defining the light emission surface of the light guide plate; and a light transmitting particle provided in plurality between the base layer and the light transmitting layer, the light transmitting particles contacting the base layer. The light transmitting particle has a refractive index higher than a refractive index of the light transmitting layer.

The refractive index of the light transmitting particle may range from about 1.4 to about 2.0, and the refractive index of the light transmitting layer may range from about 1.1 to about 1.3.

The light transmitting particle of the light guide plate may have a bead shape.

The light transmitting particle of the light guide plate may have a diameter ranging from about 10 micrometers ($\mu m$) to about 20 $\mu m$.

The base layer of the light guide plate may include glass.

The base layer may further include an adhesive layer.

The light emission surface of the light guide plate may include a concavo-convex pattern defined by the light transmitting layer.

The light transmitting layer may include a photosensitive organic material.

The backlight unit may further include a reflecting member on a rear surface of the light guide plate, the rear surface opposing the light emission surface of the light guide plate.

According to an exemplary embodiment, a display device includes: a display panel which displays an image with light; a light source which generates the light; and a light guide plate which receives the light from the light source and emits the light toward the display panel. The light guide plate includes: a light emission surface through which the emitted light exits from the light guide plate toward the display panel; a base layer; a light transmitting layer on the base layer, the light transmitting layer defining the light emission surface of the light guide plate; and a light transmitting particle provided in plurality between the base layer and the light transmitting layer, the light transmitting particles contacting the base layer. The light transmitting particle has a refractive index higher than a refractive index of the light transmitting layer.

According to an exemplary embodiment, a display device includes: a display panel which displays an image with light, the display panel including: a lower display panel, an upper display panel, and an optical medium layer between the lower and upper display panels; and a light source which generates the light. The lower display panel includes: a light guide plate which receives the light from the light source and emits the light toward the upper display panel, the light guide plate defining a base substrate of the lower display panel, the base substrate of the lower display panel including: a light emission surface through which the emitted light exits from the light guide plate toward the upper display panel; a base layer; a light transmitting layer on the base layer, the light transmitting layer defining the light emission surface of the light guide plate; and a light transmitting particle provided in plurality between the base layer and the light transmitting layer, the light transmitting particles contacting the base layer, where the light transmitting particle has a refractive index higher than a refractive index of the light transmitting layer; a gate line and a data line on the light emission surface of the light guide plate defining the base substrate; a thin film transistor connected to the gate line and the data line; and a pixel electrode connected to the thin film transistor.

The refractive index of the light transmitting particle may range from about 1.4 to about 2.0, and the refractive index of the light transmitting layer may range from about 1.1 to about 1.3.

The light transmitting particle of the light guide plate defining the base substrate may have a bead shape.

The light transmitting particle of the light guide plate defining the base substrate may have a diameter ranging from about 10 $\mu m$ to about 20 $\mu m$.

The base layer of the light guide plate defining the base substrate may include glass.

The foregoing is illustrative only and is not intended to be in any way limiting. In addition to the illustrative exemplary embodiments and features described above, further exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, where.

DETAILED DESCRIPTION

Figure 1:
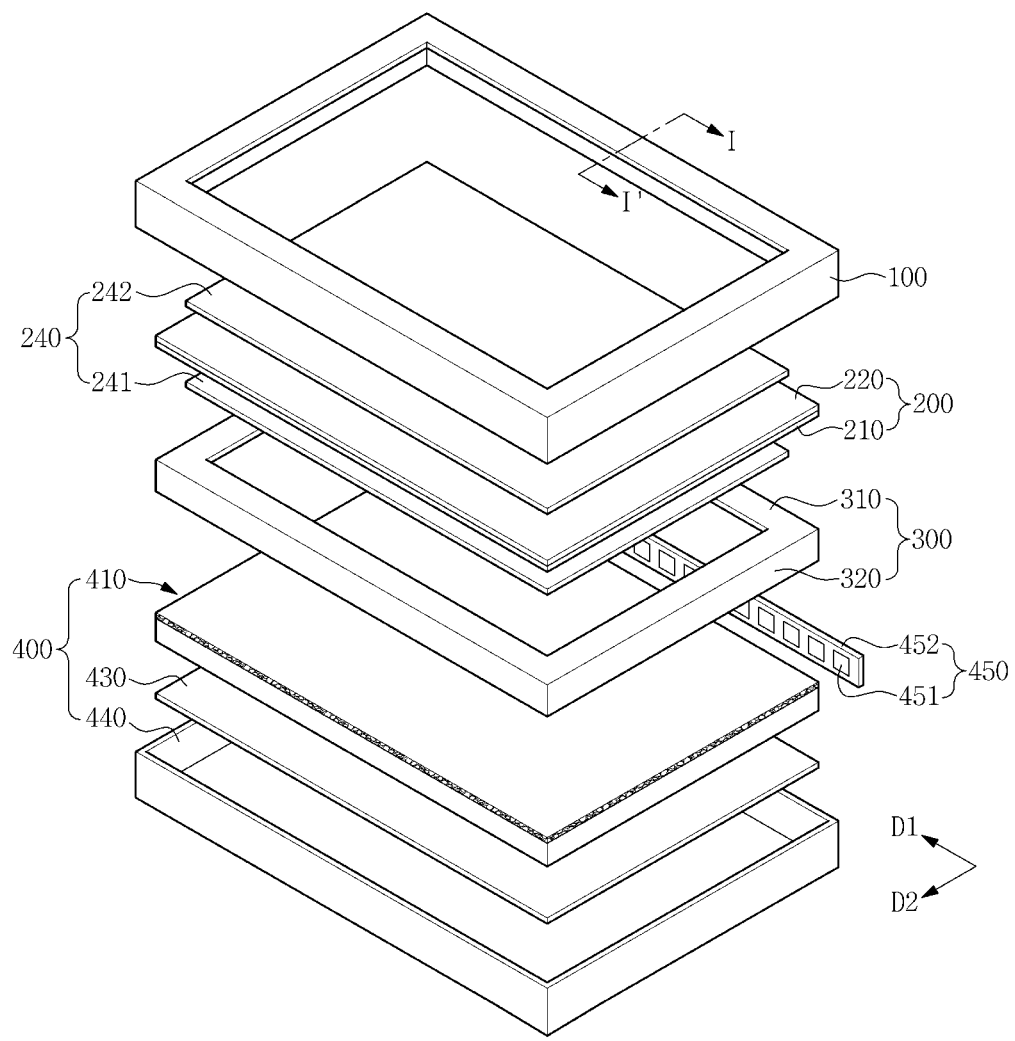
FIG. 1 is an exploded perspective view schematically illustrating an exemplary embodiment of a display device according to the invention.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area or plate is referred to as being related to another layer such as being "on" another layer, area, or plate, it may be directly on the other layer, area or plate, or intervening layers, areas or plates may be present therebetween. Conversely, when a layer, area or plate is referred to as being related to another layer such as being "directly on" another layer, area or plate, intervening layers, areas or plates may be absent therebetween. Further when a layer, area or plate is referred to as being related to another layer such as being "below" another layer, area or plate, it may be directly below the other layer, area or plate, or intervening layers, areas or plates may be present therebetween. Conversely, when a layer, area, or plate is referred to as being related to another layer such as being "directly below" another layer, area or plate, intervening layers, areas or plates may be absent therebetween.

The spatially relative terms "below," "beneath," "less," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being related to another layer such as being "connected" to another element, the element is "physically connected" to the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe exemplary embodiments of the invention and like reference numerals refer to like elements throughout the specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an exemplary embodiment of a display device according to the invention will be described in detail with reference to FIGS. 1, 2 and 3.

Figure 2:
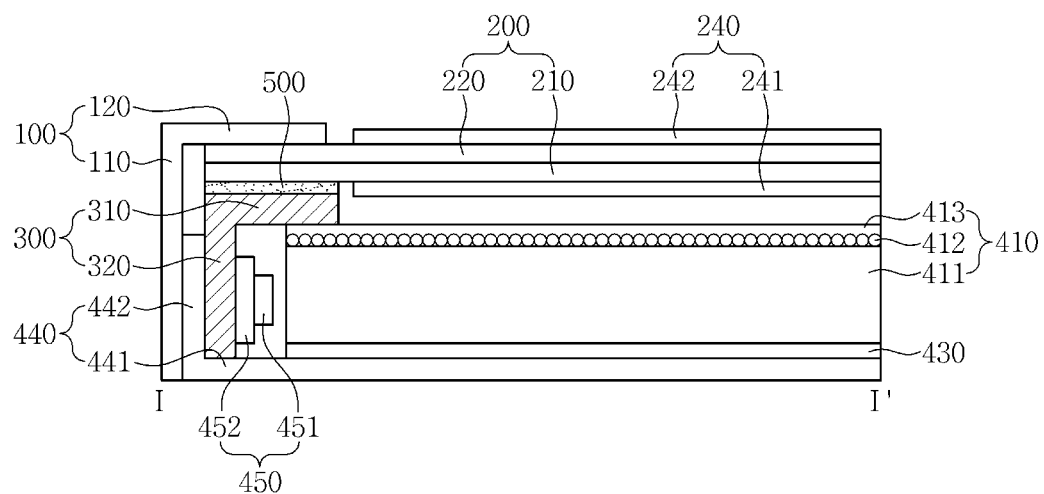
FIG. 2 is a cross-sectional view of the display device taken along line I-I' of FIG. 1.
Figure 3:
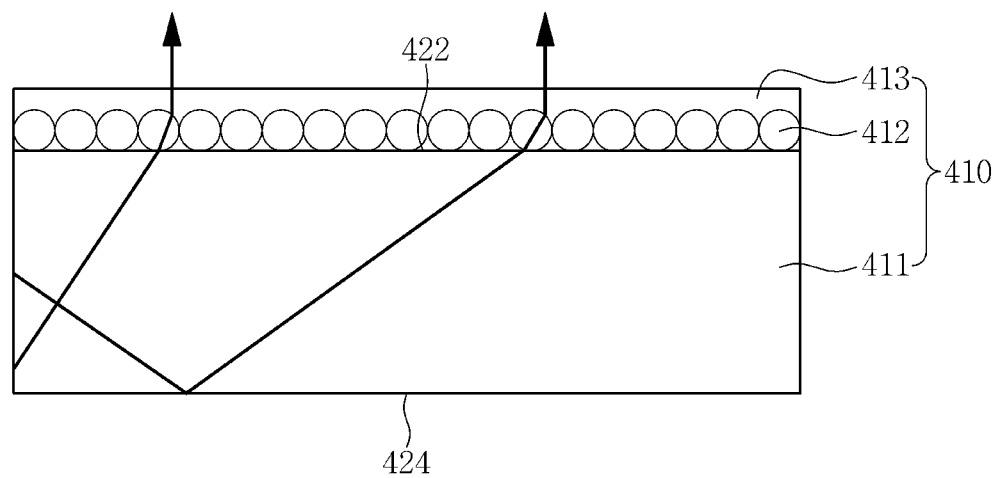
FIG. 3 is a cross-sectional view illustrating an exemplary embodiment of a light guide plate of a display device according to the invention.

FIG. 1 is an exploded perspective view schematically illustrating an exemplary embodiment of a display device according to the invention, FIG. 2 is a cross-sectional view of the display device taken along line I-I' of FIG. 1, and FIG. 3 is a cross-sectional view illustrating an exemplary embodiment of a light guide plate of a display device according to the invention. Hereinafter, for convenience of explanation, a relatively long side direction of the display device is defined as a first direction D1 and a relatively short side direction of the display device is defined as a second direction D2. A thickness of the display device is defined in a third direction which crosses each of the first and second directions D1 and D2.

Referring to FIGS. 1, 2 and 3, the display device includes a display panel 200 which generates and displays an image with light, a backlight unit 400 providing the light to the display panel 200, an upper frame (or a top chassis) 100 which covers a portion of the display panel 200 and an intermediate frame (or a mold frame) 300 on which the display panel 200 is mounted.

The upper frame 100 is coupled to a lower frame (or a bottom chassis) 440 to cover a peripheral edge of the display panel 200 mounted on the intermediate frame 300. The upper frame 100 includes an edge portion 110 coupled to the lower frame 440 and a protrusion portion 120 which is bent from the edge portion 110 to extend therefrom toward the lower frame 440. One of the edge portion 110 and the protrusion portion 120 may extend to define the other one of the edge portion 110 and the protrusion portion 120. The upper frame 100 fixes an upper edge of the display panel 200 within the display device to substantially reduce or effectively prevent detachment of the display panel 200 from the backlight unit 400.

The peripheral edge of the display panel 200 covered by the upper frame 100 is a non-display area. The upper frame 100 has an open window at a center portion thereof through which the display panel 200 is exposed.

Although not illustrated, the upper frame 100 may be coupled to the lower frame 440 using a hook and/or a screw. In addition, the coupling of the upper frame 100 and the lower frame 440 may be modified in various forms.

The upper frame 100 may include a metal material having rigidity such as stainless steel or a material having good heat dissipation characteristics such as aluminum or an aluminum alloy. In an exemplary embodiment of manufacturing the display device, the upper frame 100 may be formed by a press molding process or the like to have a predetermined curvature.

The display panel 200 displays an image with light. The display panel 200 as a light receiving type display panel, includes a liquid crystal display ("LCD") panel, an electrowetting display panel, an electrophoretic display panel, a microelectromechanical system ("MEMS") display panel and the like. In the exemplary embodiment, an LCD panel will be described by way of example. Further, although not illustrated, the display panel 200 may be a flexible panel that may be deformable or bendable in at least one direction.

The display panel 200 may be provided in a quadrangular plate shape having two pairs of sides parallel to each other. The display panel 200 according to the exemplary embodiment may be a quadrangle having a pair of relatively long sides and a pair of relatively short sides. The display panel 200 includes a lower (display) panel 210, an upper (display) panel 220 opposing the lower panel 210, and an optical medium layer such as a liquid crystal layer (not illustrated) between the lower panel 210 and the upper panel 220.

The display panel 200 includes, on a plane, a display area at which an image is displayed and a non-display area surrounding the display area and at which the image is not displayed. The non-display area is covered by the upper frame 100. The display area of the display panel 200 is exposed at the window of the upper frame 100, to outside the display device.

The lower panel 210 may include a pixel electrode to be described below and a thin film transistor electrically connected to the pixel electrode. A data line is connected to a source electrode of the thin film transistor, a gate line is connected to a gate electrode of the thin film transistor, and the pixel electrode is connected to a drain electrode of the thin film transistor. The thin film transistor switches a driving signal provided to the pixel electrode. In addition, the lower panel 210 may further include a color filter. Any of the aforementioned elements may be provided in plurality within the lower panel 210.

The upper panel 220 includes a common electrode, which forms an electric field for controlling the optical medium layer together with the pixel electrode.

As the optical medium layer, a liquid crystal layer (not illustrated) may be further provided between the lower panel 210 and the upper panel 220, and liquid crystal molecules of the liquid crystal layer are rearranged by the electric field formed between the pixel electrode and the common electrode. As such, the rearranged liquid crystal molecules adjust the transmittance of light emitted from the backlight unit 400 and the adjusted light passes through a color filter to display an image to the outside.

A driving circuit board (not illustrated) may be disposed on at least one side of the display panel 200. The driving circuit board may apply a driving signal to various signal lines provided in the lower panel 210. The driving circuit board includes a gate driving circuit board applying a scan signal and a data driving circuit board applying a data signal.

The display panel 200 and the driving circuit board are electrically connected to each other by at least one flexible printed circuit board (not illustrated). One end portion of the flexible printed circuit board overlaps a portion of the lower panel 210 to be electrically connected thereto and another end portion of the flexible printed circuit board overlaps a portion of the driving circuit board to be electrically connected thereto. The flexible printed circuit board may be a chip on film ("COF") or a tape carrier package ("TCP"), for example. The number of the flexible printed circuit boards may vary depending on the size of the display panel and the driving method thereof.

A driving chip (not illustrated) may be mounted on the flexible printed circuit board. The driving chip may generate various driving signals for driving the display panel 200. The driving chip may be represented as a driver integrated circuit ("IC") or a source IC in which a timing controller and a data driving circuit are integrated into one chip.

The flexible printed circuit board attached to one side of the display panel 200 are bent along a side wall portion 442 of the lower frame 440 to be described below, and the driving circuit board may be disposed at the side wall portion 442 of the lower frame 440 or at a rear edge portion of a bottom portion 441 of the lower frame 440.

A polarizer (member) 240 is disposed on the display panel 200 and includes a first polarizer 241 and a second polarizer 242. The first polarizer 241 and the second polarizer 242 are disposed on respective surfaces of the lower panel 210 and the upper panel 220 that are opposite to surfaces of the lower panel 210 and the upper panel 220 facing each other, respectively. That is, the first polarizer 241 may be attached to an outer side of the lower panel 210 and the second polarizer 242 may be attached to an outer side of the upper panel 220.

A transmission axis of the first polarizer 241 is substantially perpendicular to a transmission axis of the second polarizer 242. The first polarizer 241 may pass only specific polarized light among light output from the backlight unit 400 and may absorb or block the other light. The second polarizer 241 may pass only specific polarized light among light externally incident thereto and may absorb or block the other light.

The intermediate frame 300 is coupled to the lower frame 440 and supports the display panel 200. The intermediate frame 300 is provided along an edge of the display panel 200 to support the display panel 200 from below the display panel 200. The intermediate frame 300 may be provided at a position corresponding to each of four sides of the display panel 200 or a position corresponding to less than the four sides. In an exemplary embodiment, for example, the intermediate frame 300 may have a quadrangular loop shape corresponding to the four sides of the display panel 200.

As illustrated in FIG. 2, the intermediate frame 300 includes a support portion 310 supporting the display panel 200 and a side surface portion 320 which is bent from the support portion 310. In the thickness direction of the display device, a length of the side surface portion 320 according to the exemplary embodiment is longer than a length of the side wall portion 442 of the lower frame 440 to be described below.

The intermediate frame 300 may include a flexible material such as plastic to substantially reduce or effectively prevent breakage of the display panel 200. In addition, the intermediate frame 300 may include a metal material to secure the fastening force with the lower frame 440 and rigidity of the side surface portion 320. In the case where the intermediate frame 300 includes a metal material, the side surface portion 320 may have a thickness ranging from about 0.1 millimeter (mm) to about 0.3 mm, so as to be bendable relative to the support portion 310. However, exemplary embodiments are not limited thereto and the thickness of the side surface portion 320 may be variously set so that both ductility and rigidity of the side surface portion 320 may be secured. Where the length of the side surface portion 320 extends in the thickness direction of the display device, the thickness of the side surface portion 320 is defined in the first direction D1 or in the second direction D2 (horizontal in FIG. 2).

The backlight unit 400 includes a light guide plate 410, a reflection sheet 430, the lower frame 440 and a light source unit 450.

The light source unit 450 includes a light source 451 and a circuit board 452 on which the light source 451 is disposed. The light source 451 may be provided in plurality on the circuit board 452. The light source unit 450 may be disposed at an edge portion or a light incident side surface of the light guide plate 410. That is, the light source unit 450 may generate and emit light to the edge portion or the light incident side surface of the light guide plate 410.

The light source 451 may include at least one light emitting diode ("LED") chip (not illustrated) and a package (not illustrated) in which the LED chip is accommodated. The light source 451 may have an emission surface in a direction in which the light guide plate 410 is disposed. The light emitted from the light source 451 may be blue light.

In such an exemplary embodiment, the light source 451 may be selectively driven according to a driving scheme of the display device. In an exemplary embodiment, for example, in a wide viewing angle mode, the entirety of light sources 451 are driven to provide light at an entire area of an emission surface of the display device, such as at a light guide plate, and in a narrow viewing angle mode, at least one light source 451 is driven to provide light at a central area of the emission surface of the display device. In addition, the narrow viewing angle mode may be subdivided by adjusting the number of light emission of the light sources 451 in the central area of the emission surface of the display device.

The circuit board 452 includes, for example, a printed circuit board ("PCB") or a metal printed circuit board (metal "PCB").

The light source unit 450 may be disposed or formed at one side, at opposite sides or at all four sides of the light guide plate 410, or may be disposed or formed at one or more of the edge portions of the light guide plate 410 in consideration of the size, luminance uniformity and the like of the display panel 200.

Although not illustrated, a heat dissipation member (not illustrated) may be disposed between the light source unit 450 and the lower frame 440. The heat dissipation member dissipates heat generated in the light source unit 450 to the outside of the backlight unit 400 and/or the display device. In the case where the light source unit 450 is arranged in a bar or line shape at one side surface of the lower frame 440, the heat dissipation member may also be arranged as a metal frame having a bar or line shape. As described above, the heat dissipation member may have various shapes according to the shape of the light source unit 450.

The light guide plate 410 receives the light generated and emitted from the light source 451 through the light incident side surface and emits the light toward a light emission surface of the light guide plate 410. The light guide plate 410 uniformly supplies the light generated by the light source unit 450 to the display panel 200. The light guide plate 410 is disposed in the vicinity of the light source unit 450 and is accommodated in the lower frame 440. The light guide plate 410 may be formed, for example, into a quadrangular plate shape similar to the display panel 200.

The light guide plate 410 according to the exemplary embodiment includes a base layer 411, a light transmitting particle 412 and a light transmitting layer 413. The light transmitting particle 412 provided in plurality and the light transmitting layer 413 may collectively define a light transmitting layer on the base layer 411.

Referring to FIG. 3, the base layer 411 includes a light incident surface (not illustrated) receiving light from the light source 451, a light emission surface 422 through which light is output toward the display panel 200, a light opposing surface (not illustrated) opposing the light incident surface and a rear surface 424 opposing the light emission surface 422. Side surfaces of the base layer 411 respectively connect the light emission surface 422 and the rear surface 424 to each other. The light incident surface and the light opposing surface of the base layer 411 are defined by side surfaces thereof.

The light incident surface of the base layer 411 is adjacent to the light source unit 450 and receives the light generated from the light source 451. The light emission surface 422 of the base layer 411 faces the display panel 200 and emits the light guided by the base layer 411 to the light transmitting particles 412 and the light transmitting layer 413. The light opposing surface of the base layer 411 opposes the light incident surface.

Although not illustrated, the light opposing surface of the base layer 411 may further include a zigzag pattern or a reflective layer for reflecting light incident thereto. The zigzag pattern or the reflective layer re-reflects the light that is incident to the light incident surface and propagates through the inside of the base layer 411 to reach the light opposing surface toward the inside of the base layer 411, thus improving reflection efficiency. In such an exemplary embodiment, the reflective layer may be formed in various ways. In an exemplary embodiment of manufacturing a display device, for example, the reflective layer may be formed by depositing a metal on the light opposing surface of the base layer 411. The metal may include silver, aluminum, chromium, nickel and the like. The rear surface 424 of the base layer 411 opposes the aforementioned light emission surface 422 and is connected to each of the light incident surface and the light opposing surface to define an edge of the base layer 411.

The base layer 411 according to the exemplary embodiment includes glass. The base layer 411 including glass may have a refractive index ranging from about 1.4 to about 1.6.

The base layer 411 has an overall quadrangular shape when viewed from above the light emission surface 422 (e.g., in a top plan view). The base layer 411 converts the incident light having a point light source optical distribution or a circular light source optical distribution into an emission light having a surface light source optical distribution.

In addition, although not illustrated, the base layer 411 may have a wedge shape that gradually becomes thicker in a direction from the light incident surface toward the light opposing surface. Accordingly, the light incident to the light incident surface is totally reflected by the light emission surface 422 and the rear surface 424 of the base layer 411 which is inclined in a wedge shape and proceeds toward the light opposing surface. The propagating light is reflected through the zigzag pattern or the reflective layer of the light opposing surface and re-proceeds toward the light incident surface again. The light re-propagating toward the light incident surface has a total reflection angle reduced by a tilt angle of the wedge-shaped base layer 411. In the case where the light is out of a total reflection critical angle, the light is output through the light emission surface 422 of the base layer 411.

The light transmitting particles 412 are applied in contact with the light emission surface 422 of the base layer 411. The light transmitting particles 412 each have a discrete shape such as a bead shape. In such an exemplary embodiment, a refractive index of the light transmitting particles 412 is greater than a refractive index of the base layer 411. However, exemplary embodiments are not limited thereto, and the refractive index of the light transmitting particles 412 may be substantially the same as the refractive index of the base layer 411. In an exemplary embodiment, for example, the light transmitting particles 412 may have a refractive index ranging from about 1.4 to about 2.0.

The light transmitting layer 413 may be disposed to fill gaps or spaces between the discrete-shaped light transmitting particles 412, but the invention is not limited thereto. The light transmitting layer 413 defines an emission surface of the overall light guide plate 410. The light transmitting layer 413 and the light transmitting particles 412 therein define a portion of a light incident surface of the overall light guide plate 410, along with the light incident surface of the base layer 411.

The light guide plate 410 according to the exemplary embodiment includes the base layer 411 and the light transmitting particles 412 having different refractive indices from each other, thereby capable of improving the diffusibility of light incident to the light guide plate 410. That is, the light incident from the base layer 411 to the light transmitting particles 412 may be dispersed to substantially reduce or effectively prevent partial concentration of the light.

The light transmitting particles 412 may include at least one material of polymethyl methacrylate ("PMMA"), polycarbonate ("PC"), polystyrene ("PS") and nylon.

The light transmitting layer 413 is disposed on the base layer 411 to which the light transmitting particles 412 are applied. In such an exemplary embodiment, a refractive index of the light transmitting layer 413 is less than the refractive indices of each of the base layer 411 and the light transmitting particles 412. In an exemplary embodiment, for example, the light transmitting layer 413 may have a refractive index ranging from about 1.1 to about 1.3.

The light guide plate 410 according to the exemplary embodiment includes the light transmitting particles 412 and the light transmitting layer 413 having different refractive indices from each other, thereby capable of improving the straightness (e.g., direction perpendicular to the emission surface of the overall light guide plate 410 and towards the display panel 200) of the light incident to the light guide plate 410. That is, as illustrated in FIG. 3, the light incident from the light transmitting particles 412 to the light transmitting layer 413 is allowed to proceed in a direction perpendicular to the display panel 200 from the emission surface of the light guide plate 410. In addition, the light transmitting layer 413 is disposed above the bead-shaped light transmitting particles 412 and serves to planarize an upper surface of the light guide plate 410, such as to define a planar emission surface of the light guide plate 410.

In such an exemplary embodiment, a diameter of the light transmitting particles 412 and a cross-sectional thickness of the light transmitting layer 413 may be appropriately determined in consideration of the size, luminance uniformity and the like of the display panel 200. In an exemplary embodiment, for example, the light transmitting particles 412 may have a diameter ranging from about 10 micrometers (μm) to about 20 μm. The light transmitting layer 413 may have a cross-sectional thickness such that the light transmitting particles 412 are not exposed to the outside the light guide plate 410, that is, a thickness larger than the diameter of the light transmitting particles 412.

Since the light guide plate 410 according to the exemplary embodiment includes the base layer 411, the light transmitting particles 412 and the light transmitting layer 413 each having different refractive indices from each other, the diffusibility and straightness of the light incident to the light guide plate 410 and emitted therefrom may be improved. That is, the light incident to the light guide plate 410 may be uniformly irradiated to the display panel 200 from an entirety of the emission surface of the light guide plate 410 and an amount of light propagating straight toward the display panel 200 may be increased. Accordingly, it is possible to improve the uniformity and luminance of the light emitted from the light guide plate 410, without including an additional optical sheet such as a diffusion sheet or a prism sheet.

In addition, in a method of manufacturing the display device, since the bead-shaped light transmitting particles 412 are applied to the base layer 411 and the light transmitting layer 413 is then formed above the base layer 411 having the light transmitting particles 412 applied thereon, it may not be necessary to form a separate pattern on an upper surface or a lower surface of the light guide plate 410 in order to improve the uniformity and luminance of the light emitted from the light guide plate 410. Accordingly, the manufacturing process of the light guide plate 410 may be simplified, the manufacturing costs of the display device may be reduced and a relatively slim thickness display device may be provided.

Although not illustrated, a wavelength converter (not illustrated) may be disposed between the light guide plate 410 and the light source unit 450. The wavelength converter may include a material that changes the wavelength of light incident thereto. In an exemplary embodiment, for example, the wavelength converter may convert a wavelength of a blue light emitted from a blue LED light source into a white light.

The reflection sheet 430 is disposed between the light guide plate 410 and the lower frame 440. The reflection sheet 430 reflects a light guided downwards by the light guide plate 410 to be directed upwards toward the display panel 200, thus improving luminous efficiency.

The reflection sheet 430 may include, for example, polyethylene terephthalate ("PET"), thus having reflective characteristics. A surface of the reflection sheet 430 may be coated with a diffusion layer including, for example, titanium dioxide.

In an exemplary embodiment, the reflection sheet 430 may include a material including a metal such as silver (Ag).

The lower frame 440 accommodates the reflection sheet 430 and the light guide plate 410 therein. The lower frame 440 includes the bottom portion 441 and the side wall portion 442 which is extended bent from the bottom portion 441. One of the bottom portion 441 and the side wall portion 442 may extend to define the other one of the bottom portion 441 and the side wall portion 442. The bottom portion 441 of the lower frame 440 is parallel to the light guide plate 410. The lower frame 440 may include a relatively rigid metal material such as stainless steel or a material having good heat dissipation properties such as aluminum or an aluminum alloy. The lower frame 440 according to the exemplary embodiment maintains the overall framework of the display device and protects various components accommodated therein.

The display device according to the exemplary embodiment includes an adhesive member 500 positioned between the intermediate frame 300 and the display panel 200 to improve the adhesion between the intermediate frame 300 and the display panel 200.

The adhesive member 500 is disposed on an upper surface of the support portion 310 of the intermediate frame 300 and fixes the display panel 200 to the intermediate frame 300. That is, a first surface of the adhesive member 500 is attached to the intermediate frame 300 and a second surface of the adhesive member 500 opposite to the first surface thereof is attached to the display panel 200.

The adhesive member 500 according to the exemplary embodiment may be a double-sided tape. In such an exemplary embodiment, at least one surface of the double-sided tape may include at least one selected from an acrylic resin, an epoxy resin, a fluoro resin and a polytetrafluoroethylene resin such as Teflon™ resin.

In addition, although not illustrated, an additional adhesive member may be further provided between the side surface portion 320 and the side wall portion 442 to secure the adhesion force between the intermediate frame 300 and the lower frame 440.

Hereinafter, another exemplary embodiment will be described with reference to FIG. 4.

Figure 4:
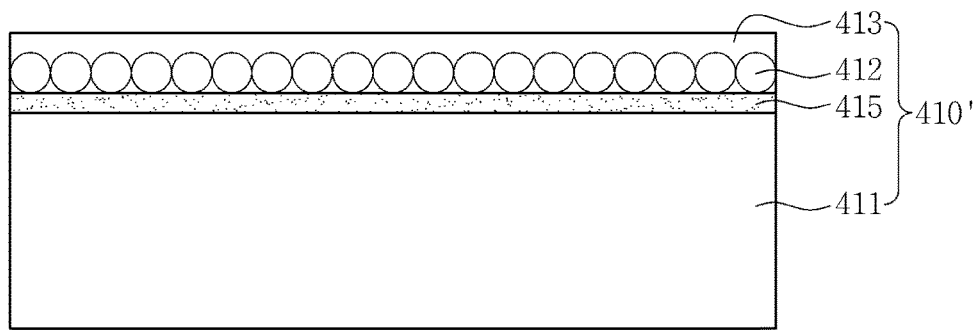
FIG. 4 is a cross-sectional view illustrating another exemplary embodiment of a light guide plate of a display device according to the invention.

FIG. 4 is a cross-sectional view illustrating another exemplary embodiment of a light guide plate 410' of a display device according to the invention.

The light guide plate 410' according to the exemplary embodiment includes a base layer 411, a light transmitting particle 412 provided in plurality within a layer, a light transmitting layer 413 and an adhesive layer 415.

There is no particular limitation on the kind of the adhesive layer 415. In an exemplary embodiment, for example, the adhesive layer 415 may include at least one selected from an acrylic resin, an epoxy resin, a fluoro-resin and a polytetrafluoroethylene resin such as Teflon™ resin. In a method of manufacturing the display device, the adhesive layer 415 may be formed by curing a liquid adhesive material.

The light guide plate 410' according to the exemplary embodiment further includes the adhesive layer 415 on the base layer 411 so that the bead-shaped light transmitting particles 412 may be fixed to the base layer 411. That is, the base layer 411 may include the adhesive layer 415.

In such an exemplary embodiment, the adhesive layer 415 may have a substantially same refractive index as refractive indices of the base layer 411 or the light transmitting particles 412. That is, a light incident to the light guide plate 410' may not be refracted at a boundary or interface between the base layer 411 and the adhesive layer 415, or may not be refracted at a boundary or interface between the adhesive layer 415 and the light transmitting particle 412. Accordingly, the adhesive layer 415 may fix the light transmitting particles 412 on the base layer 411 without greatly affecting a path of a light passing through the light guide plate 410'.

Hereinafter, still another exemplary embodiment will be described with reference to FIG. 5.

Figure 5:
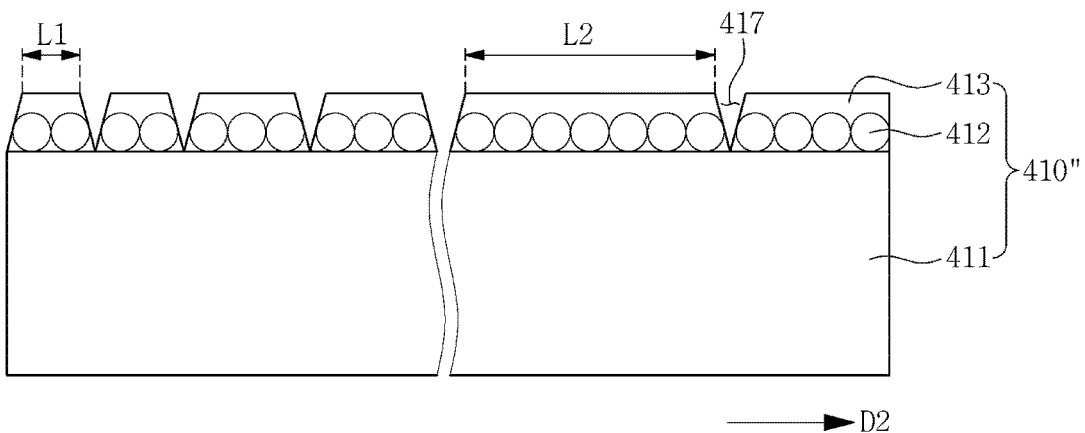
FIG. 5 is a cross-sectional view illustrating still another exemplary embodiment of a light guide plate of a display device according to the invention.

FIG. 5 is a cross-sectional view illustrating still another exemplary embodiment of a light guide plate 410" of a display device according to the invention.

The light guide plate 410" according to the exemplary embodiment includes a base layer 411, a light transmitting particle 412 provided in plurality in a layer and a light transmitting layer 413. A concavo-convex pattern is defined at an upper (emission) surface of the light guide plate 410". The concavo-convex pattern may be defined in plurality at the upper surface of the light guide plate 410".

The light transmitting layer 413 includes a photosensitive organic material. In a method of manufacturing a display device, a photosensitive organic material is applied onto the base layer 411 coated with the light transmitting particles 412 thereon and is patterned to form the light guide plate light guide plate 410" having a concavo-convex pattern at the upper surface thereof.

The light guide plate 410" according to the exemplary embodiment includes a concavo-convex pattern on a surface of the light transmitting layer 413 so that light provided from a light source unit 450 may be supplied uniformly to the display panel 200 irrespective of a distance from the light source unit 450. The second direction D2 is defined from the light incident surface of the light guide plate 410" to the light opposing surface thereof. Referring to FIG. 5, in the case where the light source unit 450 is positioned on a left side of the light guide plate 410" (e.g., at the light incident surface thereof), a convex portion of the concavo-convex pattern may have a longer length in the second direction D2 which is a direction away from the light source unit 450.

In an exemplary embodiment, for example, as illustrated in FIG. 5, in the case where a length of one convex portion of the concavo-convex pattern in an area relatively close to the light source unit 450 is defined as a first length L1 and a length of one convex portion of the concavo-convex pattern in an area relatively far from the light source unit 450 is defined as a second length L2, the first length L1 is less than the second length L2. Accordingly, a density of the light transmitting particles 412 defined within a single convex portion increases toward the second direction D2 which is a direction away from the light source unit 450. Accordingly, light provided from the light source unit 450 may be provided uniformly to the display panel 200 irrespective of a distance from the light source unit 450.

In such an exemplary embodiment, the light guide plate 410" according to the exemplary embodiment is illustrated as having a V-shaped groove 417 by defining of the concavo-convex pattern, but exemplary embodiments are not limited thereto. In an exemplary embodiment, the light guide plate 410" may have a trapezoid-shaped groove. At the groove 417, the base layer 411 may be considered exposed to outside the light guide plate 410", but the invention is not limited thereto. In addition, the light guide plate 410" may have a relatively fine-sized groove so as not to expose the base layer 411 to the outside.

Since the light guide plate 410" according to the exemplary embodiment has a concavo-convex pattern at a surface of the light transmitting layer 413 which defines the emission surface of the light guide plate 410", light provided from the light source unit 450 may be provided uniformly to the display panel 200.

It will be understood that the light guide plate of FIG. 3, FIG. 4 or FIG. 5, or features thereof, may be incorporated into the display device shown in FIGS. 1 and 2. The light guide plate of FIG. 3, FIG. 4 or FIG. 5 is formed as an integral member, such as having each of the layers thereof in contact with a respective layer adjacent thereto.

Hereinafter, another exemplary embodiment will be described with reference to FIGS. 6 and 7.

Figure 6:
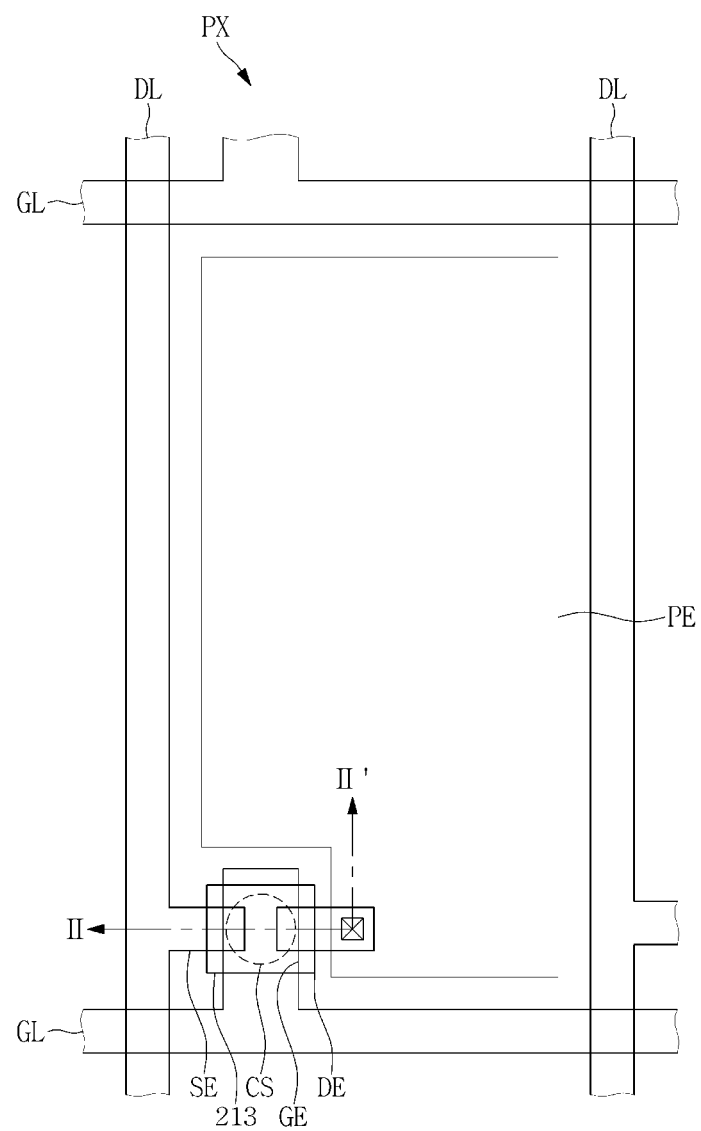
FIG. 6 is a top plan view illustrating an exemplary embodiment of a pixel of a display panel of a display device according to the invention.
Figure 7:
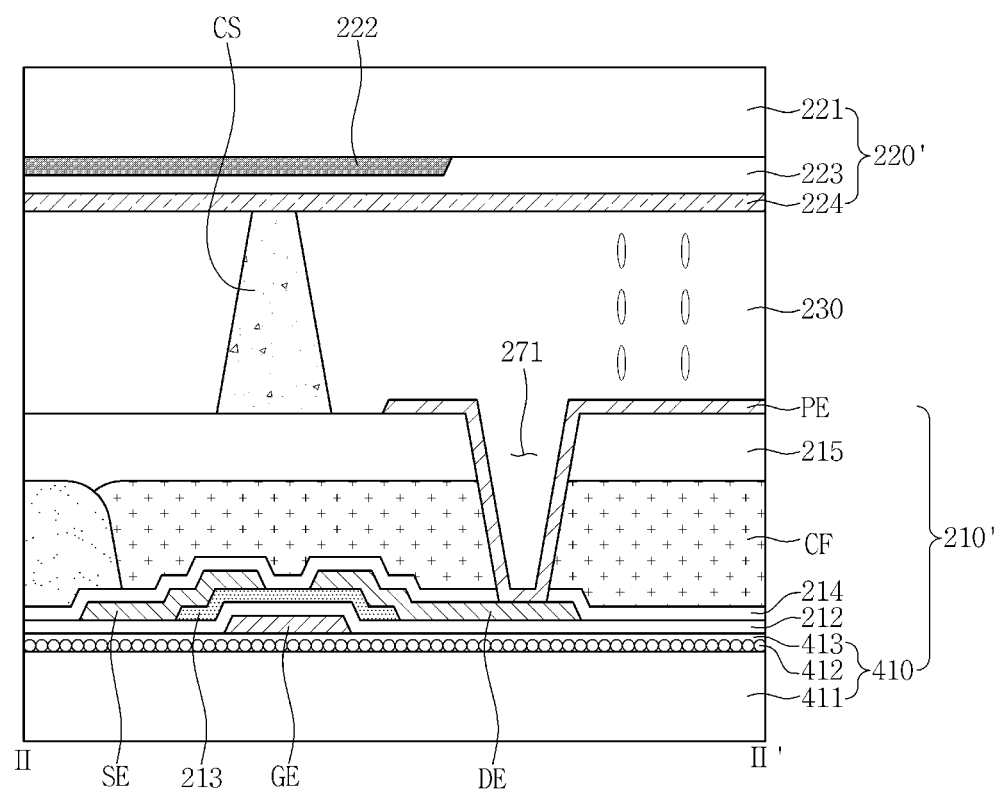
FIG. 7 is a cross-sectional view of the pixel of the display panel taken along line II-II' of FIG. 6.

FIG. 6 is a top plan view illustrating an exemplary embodiment of a pixel of a display panel of a display device according to the invention, and FIG. 7 is a cross-sectional view of the pixel of the display panel taken along line II-II' of FIG. 6. A lower (display) panel of the display device according to the exemplary embodiment includes incorporated therein, the light guide plate of FIG. 3 as an example. It will be understood that the light guide plate of FIG. 4 or FIG. 5, or features thereof, may be incorporated into the display device shown in FIGS. 6 and 7.

Referring to FIGS. 6 and 7, a display device according to the exemplary embodiment includes a lower (display) panel 210', an upper (display) panel 220' and an optical medium layer 230 such as a liquid crystal layer between the lower panel 210' and the upper panel 220'. The display device includes, on a plane, a display area at which an image is displayed and a non-display area surrounding the display area and at which the image is not displayed. The lower panel 210' and the upper panel 220' may each include a display area and a non-display area thereof respectively corresponding to or defining those of the overall display device. The lower panel 210' and the upper panel 220' may collectively define a display panel of the display device, along with the optical medium layer 230.

The lower panel 210' includes therein a light guide plate 410, a gate wiring GL and GE, a first insulating layer 212, a semiconductor layer 213, a data wiring DL, SE and DE, a second insulating layer 214, a color filter CF, an organic layer 215, a pixel electrode PE and a column spacer CS. In such an exemplary embodiment, the light guide plate 410 is used as a base substrate of the lower panel 210', and the light guide plate 410 according to the exemplary embodiment has a substantially same structure as that of the light guide plate 410 according to FIG. 3.

The gate wiring GL and GE including a gate line GL and a gate electrode GE which branches from the gate line GL is disposed on the light guide plate 410 which is used as the base substrate.

The gate wiring GL and GE may include or be formed of at least one of aluminum (Al) or alloys thereof, silver (Ag) or alloys thereof, copper (Cu) or alloys thereof, molybdenum (Mo) or alloys thereof, chromium (Cr), tantalum (Ta) and titanium (Ti).

In addition, the gate wiring GL and GE may have a multilayer structure including two or more conductive layers (not illustrated) having different physical properties from each other. In an exemplary embodiment, for example, a conductive layer of the multilayer structure may include or be formed of a metal having relatively low resistivity to reduce (control of driving) signal delay or voltage drop, e.g., an aluminum (Al)-based metal, a silver (Ag)-based metal and a copper (Cu)-based metal. Another conductive layer of the multilayer structure may include a material that has excellent contact properties with indium tin oxide ("ITO") and indium zinc oxide ("IZO"), e.g., a molybdenum-based metal, chromium, titanium and tantalum.

Examples of the multilayer structure of the gate wiring may include a chromium lower layer and an aluminum upper layer, an aluminum lower layer and a molybdenum upper layer, and a titanium lower layer and a copper upper layer. However, exemplary embodiments are not limited thereto and the gate wiring GL and GE may include various kinds of metals and conductors. In a method of manufacturing the display device, the gate wiring GL and GE may be simultaneously formed in a substantially same process, from a same material layer and may be disposed in a same layer of the lower panel 210' among layers disposed on the base substrate thereof.

The first insulating layer 212 is disposed on the base substrate light guide plate 410 having the gate wiring GL and GE thereon. The first insulating layer 212 may be referred to as a gate insulating layer. The first insulating layer 212 may include silicon oxide (SiOx) or silicon nitride (SiNx). In addition, the first insulating layer 212 may further include aluminum oxide, titanium oxide, tantalum oxide or zirconium oxide.

The semiconductor layer 213 is disposed on the first insulating layer 212. The semiconductor layer 213 may include an amorphous silicon or an oxide semiconductor including at least one of gallium (Ga), indium (In), tin (Sn) and zinc (Zn).

In an exemplary embodiment, for example, the oxide semiconductor may include at least one selected from zinc oxide (ZnO), zinc-tin oxide ("ZTO"), zinc-indium oxide ("ZIO"), indium oxide (InO), titanium oxide (TiO), indium-gallium-zinc oxide ("IGZO") and indium-zinc-tin oxide ("IZTO"). Although not illustrated, an ohmic contact layer may be disposed on the semiconductor layer 213.

The semiconductor layer 213 according to the exemplary embodiment is depicted as substantially overlapping the gate electrode GE, but exemplary embodiments are not limited thereto. In an exemplary embodiment, the semiconductor layer 213 may be disposed so as to substantially overlap the data wiring to be described below.

The data wiring DL, SE and DE including a data line DL, a source electrode SE which branches from the data line DL and a drain electrode DE which is spaced apart from the source electrode SE is disposed on the base substrate light guide plate 410 having the semiconductor layer 213 thereon.

The data wiring DL, SE and DE may include a substantially same material as that included in the aforementioned gate wiring GL and GE. In a method of manufacturing the display device, the data wiring DL, SE and DE may be formed simultaneously in a substantially same process, from a same material layer and may be disposed in a same layer of the lower panel 210' among layers disposed on the base substrate thereof.

The second insulating layer 214 is disposed on the base substrate light guide plate 410 having the data wiring DL, SE and DE thereon. The second insulating layer 214 is also referred to as an insulating interlayer. The second insulating layer 214 may include silicon oxide or silicon nitride. In addition, the second insulating layer 214 may further include aluminum oxide, titanium oxide, tantalum oxide or zirconium oxide.

The color filter CF is disposed on the second insulating layer 214. The color filter CF may have at least one of a color among red, green, blue, cyan, magenta, yellow and white. Three primary colors of red, green and blue, or cyan, magenta and yellow may define a basic pixel group for representing a color.

The organic layer 215 may be disposed on the base substrate light guide plate 410 having the color filter CF thereon. The organic layer 215 may have a monolayer structure or a multilayer structure including, for example, silicon oxide, silicon nitride, a photosensitive organic material or a silicon-based relatively low dielectric constant insulating material. The organic layer 215 may have a cross-sectional thickness ranging from about 1.0 μm to about 3.5 μm.

The pixel electrode PE connected to the drain electrode DE at and through a first contact hole 271 defined in the second insulating film 214, the color filter CF and the organic layer 215 is provided.

The pixel electrode PE may be a whole plate electrode or may take the form including a stem portion and branch portions which extend obliquely to the stem portion. The pixel electrode PE may include a transparent conductive material such as indium tin oxide ("ITO"), indium zinc oxide ("IZO"), indium tin zinc oxide ("ITZO") and aluminum zinc oxide ("AZO").

The column spacer CS is disposed on the base substrate light guide plate 410 having the pixel electrode PE thereon. The column spacer CS may be provided in plurality and divided into, for example, main column spacers or a sub-column spacer according to the height thereof protruding from a surface of the organic layer 215. The main column spacer substantially supports the lower panel 210' and the upper panel 220' relative to each other to secure a space therebetween. The sub-column spacer distributes the pressure applied to the main column spacer when pressure is applied thereto from the outside, thus providing pressure buffering effects.

The column spacers CS may have a cylindrical or truncated cone shape. The column spacer CS may include a material having light transmittance and elasticity such as acryl.

A lower alignment layer (not illustrated) may be disposed on the organic layer 215, the pixel electrode PE and the column spacer CS. The lower alignment layer may be a vertical alignment layer or a photo alignment layer including a photopolymerizable material.

The upper panel 220' includes a base substrate 221, a black matrix 222, an overcoat layer 223, a common electrode 224 or the like.

The base substrate 221 may be an insulating substrate having light transmitting properties and flexibility such as a plastic substrate. However, exemplary embodiments are not limited thereto and the base substrate 221 may include a relatively hard substrate such as a glass substrate.

The black matrix 222 is disposed on the base substrate 221. The black matrix 222 may be arranged in the display area of the display device to define a pixel area therein. The pixel area may be provided in plurality within the display device. The black matrix 222 may extend to be disposed in the non-display area of the display device. Among regions of the pixel area, the black matrix 222 may be disposed in a non-display area of the pixel area to define a display area thereof at which an image is displayed and the non-display area thereof at which the image is not displayed.

The black matrix 222 may include a metal, such as chromium oxide (CrOx), an opaque organic layer material, a photosensitive composition or the like. Examples of the photosensitive composition may include: a binder resin, a polymerizable monomer, a polymerizable oligomer, a pigment, a dispersant and a photoinitiator. The pigment may use a black pigment, a black resin, or the like.

The overcoat layer 223 is disposed on the black matrix 222. The overcoat layer 223 planarizes an uneven surface of a layer therebelow, e.g., the black matrix 222, or reduced or effectively prevents the elution of impurities from the layer therebelow.

The common electrode 224 may be disposed on the overcoat layer 223. The common electrode 224 may be a whole plate electrode including a transparent conductor such as indium tin oxide ("ITO") and indium zinc oxide ("IZO"). In an alternative exemplary embodiment, the common electrode 224 may have a concave-convex portion and/or at least one slit for defining a plurality of domains within the display area and/or the pixel area.

An upper alignment layer (not illustrated) may be disposed on the common electrode 224. The upper alignment layer (not illustrated) may be a vertical alignment layer or a photoalignment layer including a photopolymerizable material.

The lower panel 210' of the display device according to the exemplary embodiment includes a light guide plate 410 as the base substrate thereof on which remaining layers of the lower panel 210 are disposed. That is, by using the light guide plate 410 as a base substrate of the lower panel 210', a relatively light-weight and slim display device may be provided and the manufacturing costs of the display device may be reduced.

In the exemplary embodiments described herein, dimensions of elements, such as diameter, length, thickness, etc. may indicate a maximum dimension of such element in the exemplified structure.

As set forth hereinabove, according to one or more exemplary embodiments, the backlight unit and the display device which includes the backlight unit include the light guide plate including light transmitting particles and the light transmitting layer thereon, and thus, light diffusibility and straightness may be improved. In addition, the manufacturing process may be simplified to reduce the manufacturing costs and a relatively slim display device may be provided.

While the invention has been illustrated and described with reference to the exemplary embodiments thereof, it will be apparent to those of ordinary skill in the art that various changes in form and detail may be made thereto without departing from the spirit and scope of the invention.

What is claimed is:

1. A backlight unit comprising:
  a light source which generates light used by a display panel of a display device to display an image; and
  a light guide plate which receives the light from the light source and emits the light toward the display panel of the display device,
  wherein the light guide plate comprises:
    a light emission surface through which the emitted light exits from the light guide plate toward the display panel of the display device;
    a base layer;
    a light transmitting layer on the base layer, the light transmitting layer defining the light emission surface of the light guide plate; and
    a light transmitting particle provided in plurality between the base layer and the light transmitting layer, all of the light transmitting particles directly contacting a flat surface of the base layer, among which a same light transmitting particle forms an interface with both the base layer and the light transmitting layer defining the light emission surface of the light guide plate,
    wherein the light transmitting layer defining the light emission surface of the light guide plate and with which the same light transmitting particle forms the interface has a refractive index lower than each of:
      a refractive index of the same light transmitting particle forming the interface with both the base layer and the light transmitting layer defining the light emission surface of the light guide plate, and
      a refractive index of the base layer with which the same light transmitting particle forms the interface.

2. The backlight unit as claimed in claim 1, wherein
  the refractive index of the light transmitting particle ranges from about 1.4 to about 2.0, and
  the refractive index of the light transmitting layer ranges from about 1.1 to about 1.3.

3. The backlight unit as claimed in claim 1, wherein the light transmitting particle of the light guide plate has a bead shape.

4. The backlight unit as claimed in claim 3, wherein the light transmitting particle of the light guide plate has a diameter ranging from about 10 micrometers to about 20 micrometers.

5. The backlight unit as claimed in claim 1, wherein the base layer of the light guide plate comprises glass.

6. The backlight unit as claimed in claim 1, wherein
  the base layer further comprises an adhesive layer,
  the same light transmitting particle forms the interface with both the adhesive layer of the base layer and the light transmitting layer defining the light emission surface of the light guide plate, and
  the light transmitting layer defining the light emission surface of the light guide plate and with which the same light transmitting particle forms the interface has the refractive index lower than each of:
    the refractive index of the same light transmitting particle forming the interface with both the adhesive layer of the base layer and the light transmitting layer defining the light emission surface of the light guide plate, and
    the refractive index of the adhesive layer of the base layer with which the same light transmitting particle forms the interface.

7. The backlight unit as claimed in claim 1, wherein the light emission surface of the light guide plate comprises a concavo-convex pattern defined by the light transmitting layer.

8. The backlight unit as claimed in claim 7, wherein the light transmitting layer comprises a photosensitive organic material.

9. The backlight unit as claimed in claim 1, further comprising a reflecting member on a rear surface of the light guide plate, the rear surface opposing the light emission surface of the light guide plate.

10. A display device comprising:
  a display panel which displays an image with light;
  a light source which generates the light; and
  a light guide plate which receives the light from the light source and emits the light toward the display panel,
  wherein the light guide plate comprises:
    a light emission surface through which the emitted light exits from the light guide plate toward the display panel;
    a base layer;
    a light transmitting layer on the base layer, the light transmitting layer defining the light emission surface of the light guide plate; and
    a light transmitting particle provided in plurality between the base layer and the light transmitting layer, all of the light transmitting particles directly contacting a flat surface of the base layer, among which a same light transmitting particle forms an interface with both the base layer and the light transmitting layer defining the light emission surface of the light guide plate,
    wherein the light transmitting layer defining the light emission surface of the light guide plate and with which the same light transmitting particle forms the interface has a refractive index lower than each of:
      a refractive index of the same light transmitting particle forming the interface with both the base layer and the light transmitting layer defining the light emission surface of the light guide plate, and
      a refractive index of the base layer with which the same light transmitting particle forms the interface.

* * * * *